United States Patent Office 3,758,297
Patented Sept. 11, 1973

3,758,297
SAW BLADE MADE FROM W-Cr-W-Mo
CONTAINING TOOL STEEL
Jacques L. J. Demurger, 36 Place des Promenades
Populle, Roanne 42, France
No Drawing. Filed June 29, 1970, Ser. No. 50,946
Int. Cl. C22c 39/14, 39/20
U.S. Cl. 75—126 C  5 Claims

ABSTRACT OF THE DISCLOSURE

A saw blade made from alloy steel which consists essentially of about 0.75–0.90% carbon, about 3–4% chromium, about 1.3–1.6% molybdenum, about 1.5–2.5% vanadium, about 5–7% tungsten and less than 0.80% of impurities, the remainder being iron.

---

This invention relates to alloy steels and more particularly to an alloy steel for producing cutting tools or parts, such as hacksaw blades, saw blades for sawing machines, band saws, circular saws.

Carbon steel saw blades are flexible and cheap. However, they have a low wear resistance, are unable to cut hard, tough materials and have a short effective life.

It has been proposed to manufacture cutting tools from high speed steels, such as those known in the United States of America under designations M-1, M-2, T-1, and the like, according to the American Iron and Steel Institute classification. Abrasion resistance and the resistance to the softening effect of heat of such alloy steels are satisfactory for such applications. However, they lack toughness and are brittle. Moreover, as they have a high tungsten and molybdenum content (10% or more), they are very expensive particularly since they are comparatively difficult to work and roll.

About ten years ago, an attempt was made to replace these high speed steels by a steel consisting of 0.9–1% carbon, 0.2–0.4% silicon, 0.25–0.5% manganese, 3–5% chromium, 1.5–2.5% tungsten, 0.5–1.5% molybdenum and 1.5–3% vanadium. Unfortunately, this steel revealed an unsatisfactory resistance to the softening effect of heat. It softened when a temperature of about 250° C. to 300° C. was reached.

An object of the invention is to overcome such drawbacks and relates to an alloy steel which combines the advantage of moderate cost with the properties of flexibility, abrasion resistance, resistance to the softening effect of heat, toughness and machinability and is thus particularly suitable for cutting tools.

This alloy steel is characterized in that it comprises, in addition to iron, about 0.75–1.50% carbon and nickel, about 3–4% chromium, about 1.3–1.6% molybdenum, about 1.5–2.5% vanadium, about 5–7% tungsten and less than 0.80% of impurities.

Generally, the steel according to the invention comprises from 0.75% to 0.90% of carbon, and the least possible amount of nickel. However, to modify its behavior upon heat treatment, particularly in the production of band saws, up to about 1% of nickel may be included, in which case its carbon content may be reduced to 0.5%. The carbon content may be subsequently increased when this steel is formed into a saw blade or other toothed cutting tool, by the carburizing of this blade or cutting tool.

Generally, when the nickel content is very low (less than about 0.20%), the steel according to the invention preferably comprises in addition to the iron: 0.78–0.82% carbon, 3.5–4% chromium, 1.3–1.6% molybdenum, 1.5–1.6% vanadium, 6–6.4% tungsten and less than 0.80% of impurities.

These impurities are particularly those conventionally found in high speed steels, e.g. silicon, manganese, copper, tin, antimony, arsenic, the content of each of which should be as low as possible. In particular, it is preferred that the manganese content be less than about 0.35%, that the silicon content be also less than this limit amount and that the copper content be no more than about 0.20%, while both the sulfur and phosphorus contents should not be higher than about 0.025%.

Sometimes, it may be advantageous to include up to about 0.15% sulfur. This results in an improved sliding of the saw blades manufactured with this steel in the saw cut during cutting.

To improve the size and distribution of carbides and to refine the austenitic grain, this steel may also include small amounts of titanium and/or nitrogen, for example up to about 0.10%.

Finally, niobium and/or tantalum may also be included in the composition, in amounts of up to about 1%.

This alloy steel is particularly suitable for producing cutting tools, such as saw blades.

A saw blade may be produced as follows:

A saw blade blank composed of a steel according to the invention is machined so as to form saw teeth and then heat treated so as to harden the cutting part of the blade, this heat treatment comprising warming up to about 500–600° C., followed by pre-heating to about 800–850° C. and then heating to about 1160° C.–1200° C.

The saw blade is then cooled in air or in an oil or salt bath in a conventional manner and then submitted to one or more tempering treatments, at about 520–580° C., with optional interruption of this tempering treatment between about 200 and 300° C. for about 1–6 hours so as to obtain a bainitic structure.

Steel saw blades were thus manufactured whose cutting parts had a Rockwell C Hardness above 60 and were capable of reaching temperatures of about 350° C. without softening. The saw blades were very easily machined and toothed.

A straight saw blade made of steel according to the invention and hardened by the total hardening process, has the qualities of both stiffness and flexibility comparable to those of saws made of carbon steel locally heat treated on the teeth and the back of the blade, with the advantage that deformations are not permanent when the blade is submitted to substantial bending and twisting stresses. Such features are highly appreciated in work on the site under awkward conditions.

An endless saw blade or band manufactured from the steel according to the invention has a highly flexible body part notwithstanding local hardening of the teeth parts. This flexibility is at least equal to that of carbon steels and steels containing 1.4–2% tungsten, and at least equal to that of semi-high speed steels of the 3–3–3 class. Finally, the welds required in the manufacture of endless saw blades are easily made.

Thin sheets or strips of the steel according to the invention are easily manufactured because this steel is more easily hot and cold rolled than high speed steels. The cutting up of sheets and bands and the machining of the teeth are also easier.

The saw blades according to the invention were tested and compared with saw blades made from high speed steel. The performances of the various saws according to the invention were found to be substantially equal to those of saws manufactured from high speed steels, as concerns the quality of the cut and resistance to softening effect of heat. On the other hand, the properties of flexibility and less brittleness were found to be far superior and a hacksaw blade 0.65 mm. thick may commonly be bent round a cylinder having a diameter of 80 mm. a great many times on each side without breaking, and its ends may also be twisted through about 320–360°

(with a distance of 300 mm. between the ends) in both directions, without breaking.

Such performances are not commonly obtainable with identical hacksaw blades manufactured from high speed steels.

With a hacksaw blade according to the invention, 0.65 mm. thick and 300 mm. long, it is possible, under normal cutting conditions, to make 50 cuts in an alloy structural steel having a diameter of 20 mm. and having a Rockwell C Hardness of 40, while with the same blade manufactured from good quality carbon steel it is possible to make only 10 cuts, each of which takes longer.

Having now described my invention what I claim and desire to secure by Letters Patent is:

1. A saw blade made from tool steel which consists essentially of about 0.75–0.90% carbon, about 3–4% chromium, about 1.3–1.6% molybdenum, about 1.5–2.5% vanadium, about 5–7% tungsten and less than a total amount of 0.80% of impurities, it being understood that should any one of the following elements be found among said impurities it must not exceed the indicated percentages:

manganese, about 0.35%
    silicon, about 0.35%
    copper, about 0.20%
    sulphur, about 0.025%
    phosphorus, about 0.025%
    balance essentially iron.

2. A saw blade as claimed in claim 1, wherein the steel further contains up to about 0.10% of a component selected from the group consisting of titanium, nitrogen and mixtures thereof.

3. A saw blade as claimed in claim 1, wherein the steel further contains up to about 1% of a component selected from the group consisting of niobium, tantalum and mixtures thereof.

4. A saw blade as claimed in claim 1, wherein the steel further contains up to about 0.15% of sulfur.

5. A saw blade as claimed in claim 1, wherein the steel further contains up to about 1% nickel.

References Cited

UNITED STATES PATENTS

| | | | |
|---|---|---|---|
| 1,496,980 | 6/1924 | Armstrong | 75—126 R |
| 1,858,705 | 5/1932 | German | 75—126 R X |
| 1,370,020 | 3/1921 | Johnson | 75—126 E |
| 1,937,334 | 11/1933 | Emmons | 75—126 E |
| 2,209,623 | 7/1940 | Houdremont et al. | 75—126 E |
| 2,212,227 | 8/1940 | De Vries | 75—126 E |
| 2,241,187 | 5/1941 | De Vries | 75—126 E |
| 2,343,069 | 2/1944 | Luerssen et al. | 75—126 E |
| 2,736,650 | 2/1956 | Grimshaw | 75—126 E |
| 3,295,964 | 1/1967 | Kondo et al. | 75—126 E |
| 1,998,954 | 4/1935 | Emmons | 75—126 R X |
| 1,998,955 | 4/1935 | Emmons | 75—126 R X |
| 1,998,956 | 4/1935 | Emmons | 75—126 R X |
| 2,183,014 | 12/1939 | Emmons | 75—128 |
| 2,289,081 | 7/1942 | Shortell | 75—123 J X |
| 2,562,543 | 7/1951 | Gippert | 75—123 J |

FOREIGN PATENTS

| | | | |
|---|---|---|---|
| 696,883 | 9/1933 | Great Britain | 75—128 R X |

OTHER REFERENCES

Tool Steels, 3rd ed., 1962, ASM, pp. 234–237.

L. DEWAYNE RUTLEDGE, Primary Examiner

U.S. Cl. X.R.

75—126 E, 128 G, 128 W